United States Patent [19]

Slavin et al.

[11] 4,232,287

[45] Nov. 4, 1980

[54] TONE GENERATOR

[75] Inventors: Michael Slavin, Troy; Juhan Telmet, Fraser, both of Mich.

[73] Assignee: Lectron Products, Inc., Troy, Mich.

[21] Appl. No.: 13,094

[22] Filed: Feb. 21, 1979

Related U.S. Application Data

[62] Division of Ser. No. 814,417, Jul. 11, 1977.

[51] Int. Cl.[3] .............................................. B60R 21/10

[52] U.S. Cl. .................................. 340/52 E; 340/388

[58] Field of Search ............................ 340/52 E, 388; 307/10 SB

[56] References Cited

U.S. PATENT DOCUMENTS

3,944,970 3/1976 Jenne et al. ........................ 340/52 E

*Primary Examiner*—Harold I. Pitts

*Attorney, Agent, or Firm*—Harness, Dickey & Pierce

[57] ABSTRACT

A tone generator for producing an audible sound for a predetermined time period in response to the occurrence of one or more predetermined conditions. The tone generator comprises a diaphragm mounted within a resonant sound cavity that is activated by an electromagnetic assembly which is in turn driven by the output signal from an oscillator circuit. The control logic and timing circuit for the tone generator includes a unique PTC subassembly that provides a timed logic signal for controlling the activations of the diaphragm, as well as an independently generated signal for contemporaneously activating a lamp which provides a visual indication of the detected predetermined condition. The control logic and timing circuit is adapted to produce the proper timed logic signal despite the absence of a lamp in the circuit or a lamp failure.

6 Claims, 9 Drawing Figures

FIG. 1.
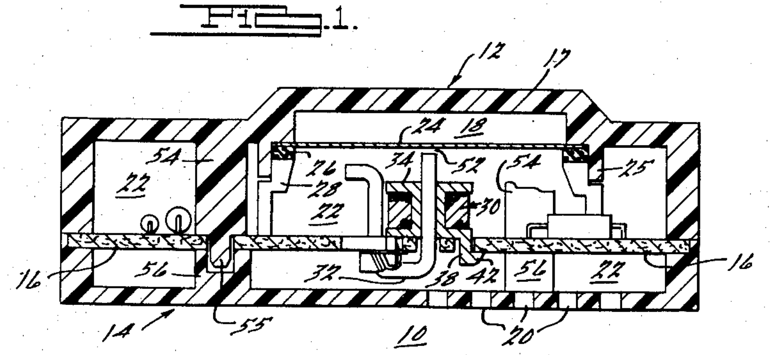
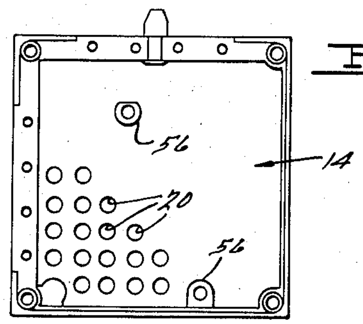
FIG. 2.
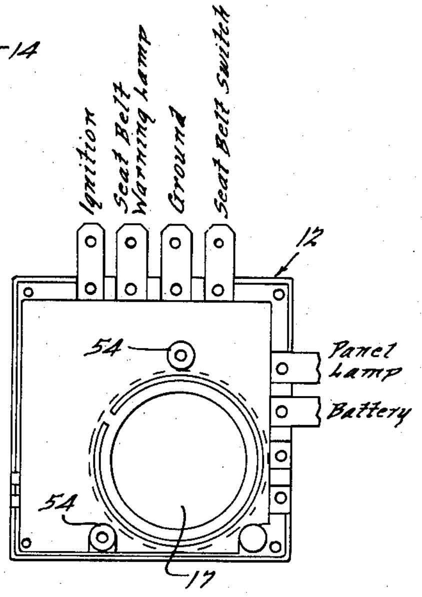
FIG. 3.

FIG. 5b.
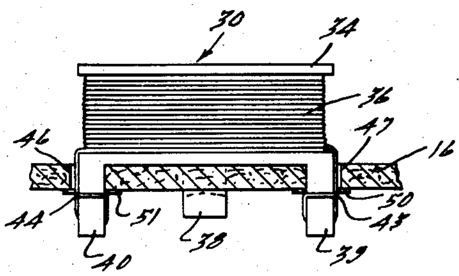
FIG. 6a.
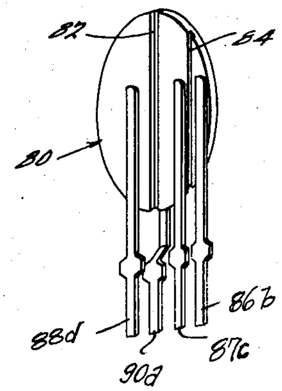
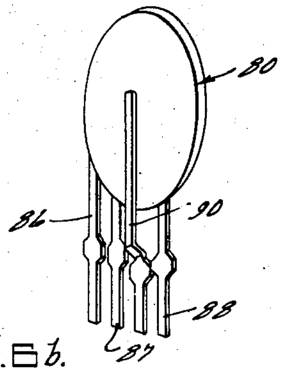
FIG. 6b.
FIG. 7.
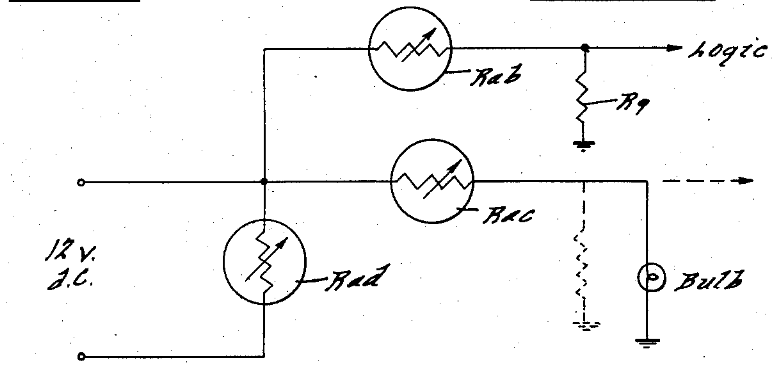

TONE GENERATOR

This is a division of application Ser. No. 814,417, filed July 11, 1977.

BACKGROUND AND SUMMARY

The present invention relates to tone generators or contactless buzzers and in particular to a tone generator that is especially suited for use in automobiles for providing an audible as well as a visual warning indication of the occurrence of one or more predetermined conditions.

Current federal regulations require that all automobiles be equipped with devices that will provide a 4 to 8 second audible warning whenever the automobile is attempted to be operated without the seatbelts properly fastened. Such devices typically take the form of a buzzer unit that is controlled by a bimetallic timer circuit which is adjusted to time out within the appropriate time period. A warning light must also be activated contemporaneously with the buzzer, although federal regulations require that the audible warning operate despite an absence or failure of the warning light. Frequently, the same buzzer may also be used to provide a "headlamp ON" warning or a "key in the ignition" warning as well.

Although such devices are certainly adequate for their intended purpose, there are certain disadvantages that are inherent in any device that utilizes a bimetallic element. Bimetallic elements function to open a circuit by deflecting as the element is heated by the heating coil typically wrapped around the bimetallic element. However, in order to produce the desired time delay, the physical orientation of the bimetallic element must be manually adjusted so that the deflection of the element breaks the circuit at the appropriate time. In addition, the fine heating wire that is wrapped around the element usually must be spot welded rather than simply flow soldered along with the other components in the circuit. Thus, it is apparent that the manufacture of a buzzer unit having a bimetallic element is a rather labor intensive process, and therefore can add significantly to the basic component cost of the unit. Furthermore, in that a bimetallic element is a temperature responsive device, the time delay introduced by the element is affected by changes in ambient temperature. Accordingly, the accuracy of the unit can be seriously hampered if subjected to significant temperature variations. Moreover, the substantial heat generated by the bimetallic element can present problems for other circuit elements unless adequate heat dissipation is provided.

Accordingly, it is the primary objective of the present invention to avoid the disadvantages inherent in the use of bimetallic elements by designing a tone generator that utilizes positive temperature coefficient (PTC) resistors to generate the necessary time delay. The idea of substituting a PTC resistor for the bimetallic element is not new and has been attempted in the past. However, certain problems invariably arise which make the "straight-forward" substitution of a PTC resistor impractical. Specifically, because the resistance value of a PTC resistor is temperature sensitive, a straight series connection of a PTC resistor in circuit with a lamp and a logic line will not result in a circuit that will function adequately over the required temperature range. Moreover, if the lamp burns out or is removed, the change in the resistance characteristics of the circuit will prevent the PTC resistor from timing out. Furthermore, if a resistor is inserted in parallel with the lamp to insure the presence of a pull-down resistance in the even of a lamp failure, the additional voltage drop across the resistor will prevent the lamp from lighting properly. Consequently, because of these obstacles, PTC resistors have not been employed despite their apparent promise.

The present invention solves these problems by devising a circuit that utilizes a unique triple PTC element, with one PTC resistor used as the primary heating element, another as a switching element for the lamp, and the third as a logic switching element for the logic signal that times the tone generator. In this manner, the problems posed by the use of PTC resistors previously discussed are overcome. More particularly, since a separate logic switching element is provided apart from the heating element and the switching element that controls the activation of the lamp, the circuit will continue to function properly and provide an audible warning for the prescribed time period despite the absence of a bulb or a bulb failure. In addition, due to the utilization of a separate heating element, the delay time of the unit will remain within the 4 to 8 second specification period over a wide range of ambient temperatures. Importantly, the PTC element is inexpensive, does not require separate manual adjustment to set the delay time, and can be flow soldered to the printed circuit board along with the other circuit elements. Thus, a significant savings is realized in the cost of manufacturing a tone generator according to the present invention.

In addition, the present invention includes a novel electromagnetic transducer that is also inexpensive to manufacture. More particularly, a diaphragm is placed over a recess in the cover of the unit and secured by a foam gasket and plastic retainer ring that simply snaps into place, thereby forming a sealed sound cavity within the cover of the unit. A printed circuit board having the electrical components of the control circuit and the electromagnetic coil mounted thereon, is secured between the cover and the casing of the unit when the outer two pieces are joined together. The relative position of the coil and the diaphragm when the unit is assembled is designed so that the proper air gap will result between the pole piece of the coil and the diaphragm, thus eliminating the need for manually setting the appropriate air gap.

Further objects and advantages of the present invention will become apparent from a reading of the detailed description of the preferred embodiment which makes reference to the following set of drawings in which:

BRIEF DESCRIPTION OF THE DRAWINGS

FIG. 1 is a sectional view of an assembled tone generator according to the present invention;

FIG. 2 is a view of the case for the tone generator shown in FIG. 1;

FIG. 3 is a view of the cover for the tone generator shown in FIG. 1;

FIGS. 5*a* and 5*b* illustrate in detail the manner in which the electromagnetic coil is mounted to the printed circuit board;

FIGS. 6*a* and 6*b* are an illustration of a triple PTC element of the type employed by the present invention; and FIG. 7 is a simplified circuit diagram of the PTC timing circuit comprising part of the control circuit of FIG. 4.

DETAILED DESCRIPTION OF THE PREFERRED EMBODIMENT

Referring to FIG. 1, a sectional view of an assembled tone generator 10 according to the present invention is shown. The tone generator 10 disclosed herein is very small in size, approximately two and one-half inches square by one inch high, is extremely inexpensive to manufacture, and is particularly suited to mass production. Accordingly, the present tone generator 10 is aptly suited for use in an automobile as a warning device to indicate the existence of various predetermined conditions. Specifically, the present invention can be used to provide a warning whenever the headlamps are left on after the ignition is turned off, when the keys are left in the ignition, and when the automobile is attempted to be operated without the seatbelts properly buckled. As noted in the Background and Summary, current federal regulations require that an audible warning signal be provided that will last for 4 to 8 seconds whenever the seatbelts are not fastened when the automobile is started. The control circuit for the present tone generator 10 is also adapted to automatically time the seatbelt warning signal for the prescribed period over a wide range of ambient temperatures.

Figure 4:
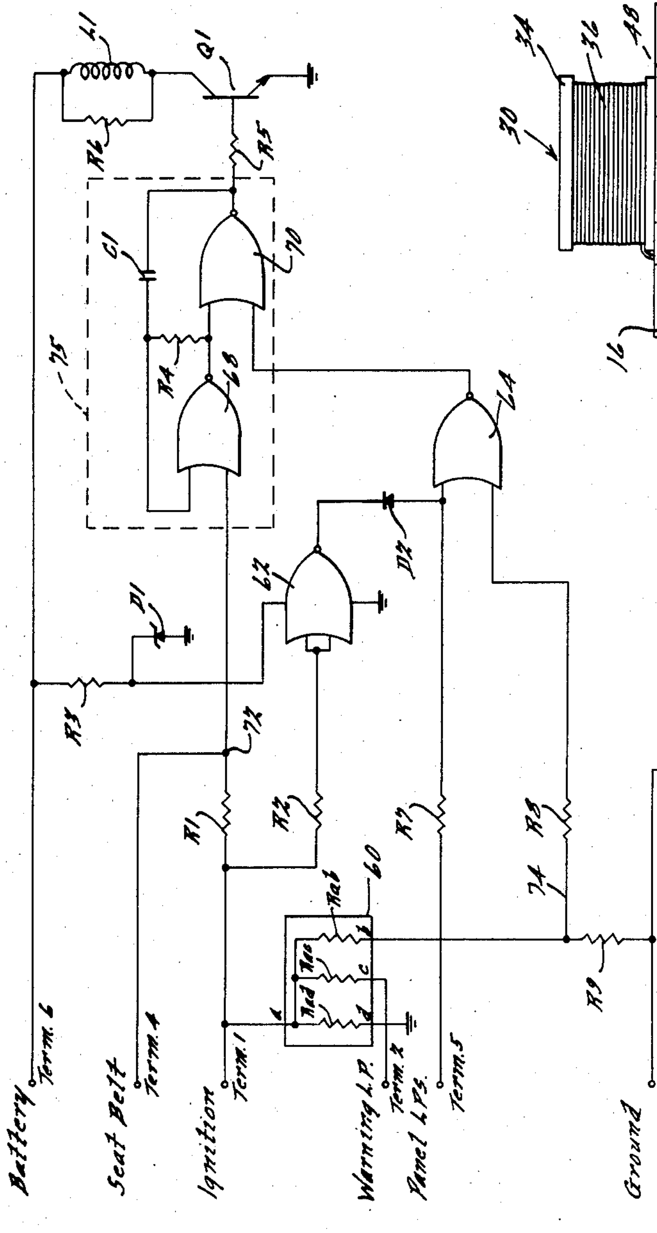
FIG. 4 is a schematic diagram of the control circuit of the present invention.

The tone generator 10 basically comprises a diaphragm 24 that is caused to vibrate and thus generate a sound by an electromagnetic coil 30 that is driven electrically by an oscillator circuit (see FIG. 4). The diaphragm 24 fits over a recess 18 in the cover 12 of the unit, and is secured in place by a foam gasket 26 and a plastic retainer ring 28. The retainer ring 28 is adapted to be simply snapped in place over the ridge 25 in the cover 12 as shown. Thus, a closed sound cavity 18 is formed within the recess of the cover 12.

Importantly, it will be noted that although the cavity 18 is closed, it is non-hermetically sealed. Specifically, it will be noted that the diameter of the diaphragm 24 is slightly less than the inside diameter of the ridge 25 in the cover 12. Therefore, due to the presence of the porous foam gasket 26 around the periphery of the diaphragm 24, slow air leakage around the diaphragm 24 due to sustained pressure differentials will be permitted. Thus, the diaphragm 24 will not become bowed or bulged when the air within the closed sound cavity 18 is heated or cooled by changes in ambient temperature. Additionally, the slow air leakage permitted around the diaphragm 24 will also prevent the difference in the coefficients of expansion between the cover 12 and the diaphragm 24 from imposing tension or compression forces on the diaphragm 24 over a wide range of ambient temperatures. At the same time, however, the seal formed around the periphery of the diaphragm 24 by the foam gasket 26 is such that for the relatively fast air movements caused by the vibration of the diaphragm 24 when excited by the electromagnetic coil 30, the cavity 18 will appear as a closed sound cavity. Briefly summarizing, the seal formed by the diaphragm 24, the foam gasket 26, and the retainer ring 28 is such that for sustained differentials in pressure caused by changes in ambient temperature, the seal formed around the diaphragm 24 will permit air leakage to balance the pressure differential across the diaphragm. However, for the rapid air movements caused by the vibration of the diaphragm 24 at the frequencies at which the device generates sound, the closed cavity 18 will appear to be sealed.

The loudness and tonal quality of the radiated sound generated by the present tone generator is determined primarily by the characteristics of the resonant sound system comprised of the diaphragm 24 having a mass M, the complicance $C_r$ provided by the foam gasket 26, and the complicance $C_c$ provided by the air in the closed cavity 18. This physical arrangement can be shown to be equivalent to an electrical series resonant circuit where M is equivalent to an inductance L, and C is equivalent to a capacitance C. The resonant frequency of the system is thus given by:

$$f = \frac{1}{2\pi\sqrt{LC}}$$

In the present tone generator, this frequency is selected to be the same as the operating frequency of the oscillator circuit (see FIG. 4).

As previously noted, the diaphragm 24 is caused to vibrate by the "pulling and pushing" forces exerted upon it by the pole piece 32 of the electromagnetic coil 30. As is well known to those skilled in the art, for the diaphragm 24 to vibrate properly, it is important that the appropriate air gap exist between the pole piece 32 and the diaphragm 24. Frequently with prior art devices, the setting of the proper air gap requires a separate manual adjustment. However, with the tone generator of the present invention the air gap between pole piece 32 and the diaphragm 24 is automatically set to the appropriate distance when the unit is assembled. Specifically, the printed circuit board 16 to which electromagnetic coil 30 is fixedly secured is spaced a predetermined distance from the diaphragm 24 by virtue of a pair of support posts 54 integral to the cover 12 which mate with a pair of support posts 56 integral to the casing 14 of the unit. The support posts 54 each have a nipple 55 protruding from the end which extends through a hole in the circuit board 16 and fits within a hole in the top of the opposite support post 56 extending from the casing 14. In this manner, when the cover 12 is heat staked to the casing 14 the printed circuit board 16 is positioned relative to the diaphragm so that the pole piece of the coil 30 mounted to the circuit board 16 will automatically be spaced the appropriate distance from the diaphragm 24. Thus, the proper air gap 52 is set simply upon assembly of the unit.

Referring now to FIG. 2, a detailed view of the casing 14 for the tone generator 10 of the present invention is shown. As previously noted, a closed sound cavity 18 is formed above the diaphragm within the recess in the cover 12. In addition, a sound cavity 22 is also formed below the diaphragm 24 within the casing 14. The closed cavity 18 above the diaphragm 24 comprises the primary sound cavity for the unit, while the ported cavity 22 below the diaphragm 24 comprises the secondary sound cavity of the unit. The secondary sound cavity 22 is ported by virtue of a series of holes 20 which are formed in the casing 14 of the unit 10. The secondary sound cavity 22 is ported in order to tune the sound cavity 22 to the primary frequency of the oscillator circuit. Specifically, the size and number of the accoustic ports 20 are selected so that the effective port size of the open sound cavity 22 is such that it resonates at the primary frequency of the diaphragm 24. In other words, by changing the number and/or size of the accoustic ports 20 the volume of the sound produced by the tone generator 10 will be altered.

Figure 5A:
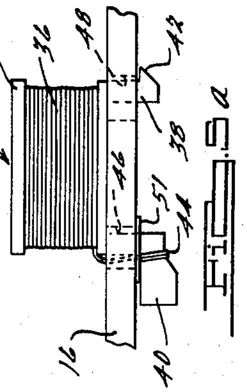

Referring now to FIGS. 5a and 5b, a detailed illustration of the manner in which the electromagnetic coil 30 is mounted to the printed circuit board 16 is shown. The electromagnetic coil 30 comprises a plurality of windings of magnetic wire 36 wound around a plastic bobbin 34. The bobbin 34 includes three mounting legs 38–40 integral to the bobbin which are used to secure the coil 30 to the printed circuit board 16. In particular, mounting legs 39 and 40 are initially inserted through a pair of holes 46 and 47, respectively, in the printed circuit board 16, and then the coil 30 is swung downward and the remaining leg 38 inserted through a third hole 48 in the printed circuit board 16 until the locking tab 42 on the end of mounting leg 38 engages the underside of the printed circuit board 16. Thus, it can be seen that the coil 30 is readily secured to the printed circuit board 16 without the need for special clips or mounting screws.

With particular reference to FIG. 5b, it will be noted that one end 44 of the coil wire 36 is wound around and terminated on mounting leg 40 and the other end 43 of the coil wire 36 is wound around and terminated on mounting leg 39. The wrapping and terminating of the wire 36 around the mounting legs 39 and 40 of the bobbin 34 is accomplished when the wire 36 is originally wound around the bobbin 34 and does not require a separate manual operation. Thus, as can be readily seen from the figures, when the coil 30 is mounted to the printed circuit board in the manner just described, the ends 43 and 44 of the coil wire 36 will automatically contact the appropriate copper pads 50 and 51 respectively, on the underside of the printed circuit board 16. Thus, the connections of the coil wire 36 to the printed circuit board 16 can be flow soldered in the conventional manner along with the other electrical components on the printed circuit board 16. Accordingly, an additional labor operation is eliminated.

Referring now to FIG. 4, a circuit diagram of the timing control circuit for the tone generator 10 of the present invention is shown. The control circuit illustrated herein is adapted to provide a 4 to 8 second audible warning upon receipt of a signal indicating that the seatbelts are not properly buckled, and a continuous audible warning upon receipt of a signal indicating that the headlamps have been left on after the ignition has been turned off. In addition, appropriate panel lamps are also activated to provide a visual warning signal coincidental with the generated audible warning. Although not included in the circuit disclosed herein, with minor circuit variation the circuit is readily adaptable to provide additional warning, such as "key in the ignition", "door ajar", etc.

In general, the control circuit includes a timing circuit logic circuitry to determine the existence of certain predetermined conditions, an oscillator circuit, and a driver circuit to drive the electromagnetic coil assembly. The timer circuit essentially comprises a triple PTC element of the type illustrated in FIGS. 6a and 6b. As can be seen from the figure, three separate PTC resistors have been produced on a single disc 80 simply by inscribing a pair of voids 82 and 84 in the surface metalization of the element. Separate leads 86–88 are then attached to each of the three metalized surface areas and a single lead 90 is attached to the backside of the disc 80. Thus, a separate PTC resistor is created between lead 90 and each of the three front leads 86–88.

PTC resistors are characterized by their temperature coefficient of resistance and the dramatic change in their resistance values at a given temperature. The temperature at which the temperature coefficient of a PTC suddenly increases is referred to as its "anomaly temperature." The characteristic anomaly temperature of a PTC resistor is determined by the particular barium titanate composition of the resistor. Characteristically, the temperature coefficient of a PTC resistor is typically low and constant at temperatures below its anomaly temperature. Thus, for example, the resistance of a PTC resistor may go from 5 ohms below its anomaly temperature to 5 kohms above its anomaly temperature.

Referring now to FIG. 7, a simplified circuit diagram illustrating the particular manner in which the triple PTC element is utilized in the present invention is shown. Basically, the three PTC resistors are utilized for three separate purposes: one ($R_{ad}$) as the primary heating element for the PTC element 60, another ($R_{ac}$) as the switching element for controlling the activation of the seatbelt warning lamp, and the third ($R_{ab}$) as the logic switching element that provides the logic signal which controls the activation of the electromagnetic coil. As will be readily apparent to those skilled in the art, the basic triple PTC timing circuit illustrated in FIG. 7 is readily adaptable to a wide variety of applications other than as a timing control circuit for an automobile seatbelt warning unit. In fact, virtually anywhere that a bimetallic element is utilized to provide a timed signal, the triple PTC circuit illustrated in FIG. 7 can be substituted therefor with the aforementioned advantages described previously. In addition, the PTC timing circuit can be employed in many applications where it is either impossible or impractical to use a bimetallic element.

When power is initially applied to the circuit, all three PTC resistors have a nominal resistance value. Accordingly, a HI signal is present on the logic line 74 and the lamp 73 is activated. However, due to the substantial current draw through heating element $R_{ad}$, the entire PTC element 60 will begin to heat up, simply by virtue of the fact that the three resistors are located on the same PTC element. Moreover, PTC resistors $R_{ab}$ and $R_{ac}$ will heat up to a certain extent as a result of their own current conduction, although due to the added resistance in their current paths, this contribution will not be as significant when compared to the heat that is transmitted from the heating element $R_{ad}$. When the anomaly temperature of the two switching elements $R_{ab}$ and $R_{ac}$ is reached; the resistance values of the two PTC resistors will increase significantly, thereby extinguishing the lamp 73 and causing the signal on the logic line 74 to go LO. Importantly, it will be noted that if the lamp 73 is removed from the circuit, or is burned out, this will have no effect on the operation of the logic PTC resistor $R_{ab}$. However, if the logic line 74 were simply tied to the midpoint of PTC resistor $R_{ac}$ and the warning lamp (as shown in phantom), the logic line would never go LO in the event of a bulb failure because the pull-down resistance of the bulb would be lost. Moreover, if an additional resistor (also shown in phantom) were connected in parallel with the lamp 73 in an effort to remedy this situation, the increased voltage drop across the resistor would prevent the lamp from lighting properly. Accordingly, it can be seen that the triple PTC arrangement disclosed herein is necessary in order for the logic line 74 to operate independently of a failure in the lamp circuit. Of course, when power is finally removed from the primary heating element $R_{ad}$, the temperature of the triple PTC element 60 will rapidly return to its ambient state and the effective resistance values of the two switching elements $R_{ab}$ and $R_{ac}$ will similarly return to their original minimum values.

Thus, as graphically depicted in FIGS. *6a* and *6b*, the "lamp" PTC resistor ($R_{ac}$) must be large enough in size so that its resistance below the anomaly temperature of the PTC element 80 is low enough to permit the lamp to light brightly. Similarly, the "heater" PTC resistor ($R_{ad}$) must be large enough to generate sufficient heat to cause the "logic" PTC resistor ($R_{ab}$) to exceed the anomaly temperature of the PTC element 80 within the prescribed 4–8 second time period even when the lamp is burned out. In addition, it is preferable that the lamp PTC resistor ($R_{ac}$) be disposed intermediate the heater and logic PTC resistors ($R_{ad}$) and ($R_{ab}$) respectively, as shown, so that the lamp PTC resistor will heat relatively evenly to prevent a gradual dimming out of the lamp.

Returning now to FIG. 4, it can be seen that the triple PTC element 60 is connected in the control circuit in the manner illustrated in FIG. 7. In particular, the heating element, PTC resistor $R_{ad}$, is connected across the ignition terminal and ground, PTC element $R_{ac}$ is connected between the ignition terminal and the terminal connected to the seatbelt warning lamp, and the logic switching element, PTC resistor $R_{ab}$, is connected between the ignition terminal and the logic line 74. Pull-down resistor R9, connected between the logic line 74 and ground, along with PTC resistor $R_{ab}$ comprise a voltage divider network which determines the switching time of the signal on logic line 74. Specifically, the value of resistor R9 is selected so that the signal on logic line 74 will switch from a HI to a LO state within the 4 to 8 second specification period.

In the event that the seatbelts are unbuckled when the ignition is turned on, node 72 will be pulled to ground despite the HI signal from the ignition terminal through resistor R1. When the signal at node 72 is LO, the oscillator circuit 75, and specifically NOR-gate 68, will be enabled. Conversely, if the seatbelts are properly buckled when the ignition is turned on, the signal at node 72 will be HI thereby disabling the oscillator circuit 75.

With the oscillator circuit 75 enabled by a LO signal at node 72, the oscillator 75 will begin to oscillate when a logic enable signal is received from the output of NOR-gate 64. As previously discussed, commencing with ignition, the signal on logic line 74 will go HI for the prescribed 4 to 8 second period, thereby rendering the signal at the output of NOR-gate 68 LO for a corresponding 4 to 8 second time period. With the signal at the output of NOR-gate 68 LO and the signal at node 72 LO, the oscillator circuit 75 will oscillate and provide a square wave drive signal through resistor R5 to the base of transistor Q1. A substantially triangular-shaped current waveform will thereby be induced through coil L1 which in turn will cause the diaphragm to vibrate at the frequency of the current waveform, thus generating the audible warning signal. When the signal on logic line 74 goes LO after the prescribed 4 to 8 second time period, the output from NOR-gate 64 will go HI thereby disabling the oscillator circuit 75.

Additionally, the disclosed control circuit is adapted to provide a sustained warning signal whenever the headlamps are left on after the ignition is turned off. This is accomplished by connecting the panel lamp terminal, which is indicative of the condition of the headlamps, through a resistor R7 to the other input of NOR-gate 64. Since the condition of the headlamps is only of concern when the ignition is turned off, the ignition terminal is connected through resistor R2 and inverter 62 to the same input of NOR-gate 64 through a diode D2. Thus, when the ignition is turned on the signal at this input of NOR-gate 64 will be pulled LO, thereby disabling the headlamp input signal. However, when the ignition is turned off, a HI signal from the panel lamp terminal will render the output of NOR-gate LO, thereby enabling the oscillator circuit 75, since the signal at node 72 will also be LO due to the fact that the ignition is turned off. Thus, a sustained audible warning will be generated until the lamps are turned off.

As previously noted, the oscillator circuit 75 drives transistor Q1 with a square wave output signal. However, a square wave signal is "rich" in harmonics and therefore does not constitute a good drive signal for the coil L1. Of course, a square wave oscillator circuit 75 is utilized rather than a pure sine wave oscillator, which produces no harmonics, because a sine wave oscillator requires much more expensive circuitry. However, the current actually induced through the coil L1 is converted from a square wave signal to an "approximated" sine wave by virtue of the inductance in th coil L1 and the resistance of resistor R6 connected in parallel with coil L1. Thus, the current signal through coil L1 is more triangular shaped, which sufficiently approximates a sine wave signal so as to cause the diaphragm to oscillate in only one mode, thereby producing a purer tone than if driven with a straight square wave signal. In particular, with the combination of the triangular shaped drive signal and the characteristics of the resonant sound system described above, the present tone generator produces substantially a pure sine wave acoustical output.

Thus, it is apparent that an easily produced, low-cost tone generator is disclosed by the present invention which is capable of generating a relatively pleasant, "clear" audible sound. Although the present invention is, as noted, particularly suited for use as a warning device on an automobile, it is also readily adaptable to any of a wide variety of other uses where an inexpensive, reliable, low-cost tone generator is desired.

While the above description constitutes the preferred embodiment of the invention, it will be appreciated that the invention is susceptible to modification, variation and change without departing from the proper scope of fair meaning of the accompanying claims.

What is claimed is:

1. A positive temperature coefficient (PTC) resistance element for a seat belt monitoring system for an automobile that is adapted to provide timed audible and visual signals when operation of said automobile is initiated without the seat belt being properly buckled; said PTC resistance element being characterized by a body of PTC material having an anomaly temperature; said body having electrically conductive contact surface layers on different discrete surfaces of said body, one of said conductive surface layers being adapted to be connected to a source of electrical power, the other of said conductive surface layers defining first, second and third contact areas electrically isolated from each other, said contact areas being apportioned and disposed so that said first and second contact areas are substantially larger than said third contact area, and said second contact area is disposed between said first and third contact areas, said first contact area being adapted to be connected to an electrical ground, said second contact area being adapted to be connected to provide said visual signal and said third contact area being adapted to be connected to provide said audible signal.

2. The PTC resistance element of claim 1 wherein said first contact area is of sufficient size so that said PTC element is heated above is anomaly temperature within a predetermined time interval after application of electrical power to said PTC element.

3. The PTC resistance element of claim 2 wherein said predetermined time interval is 4–8 seconds.

4. The PTC resistance element of claim 1 wherein said PTC resistance element comprises a disc of PTC material and said first, second and third contact areas are defined by two narrow parallel voids in said one conductive surface layer.

5. The PTC resistance element of claim 4 wherein one of said voids divides said one conductive surface layer substantially in half and the other of said voids divides one of the halves into two unequal portions with the smaller portion being separated from the other undivided half by the larger portion.

6. A positive temperature coefficient (PTC) resistance element for a seat belt monitoring system for an automobile that is adapted to provide timed audible and visual signals when operation of said automobile is initiated without the seat belt being properly buckled; said PTC resistance element being characterized by a body of PTC material having an anomaly temperature; said body having electrically conductive surface layers on opposite surfaces of said body, one of said conductive surface layers being adapted to be connected to a source of electrical power and said other conductive surface layer defining first, second and third contact areas electrically isolated from each other such that first, second and third PTC resistors are formed by each of said first, second and third contact areas respectively on said other conductive surface layer relative to said one conductive surface layer, said first contact area being adapted to be connected to an electrical ground, said second contact area being adapted to be connected to a lamp for providing said visual signal, and said third contact area being adapted to be connected to provide said audible signal; said second contact area being disposed intermediate said first and third contact areas and said first, second and third contact areas being apportioned so that said first PTC resistor is large enough to generate sufficient heat to cause said third PTC resistor to exceed said anomaly temperature within a predetermined time period, and said second PTC resistor is large enough so that its resistance below said anomaly temperature is small enough to permit the lamp to light brightly.

* * * * *